Dec. 21, 1943.  J. C. PETERS  2,337,410
ELECTRICAL CONTROL SYSTEM
Filed Nov. 25, 1941   3 Sheets-Sheet 2
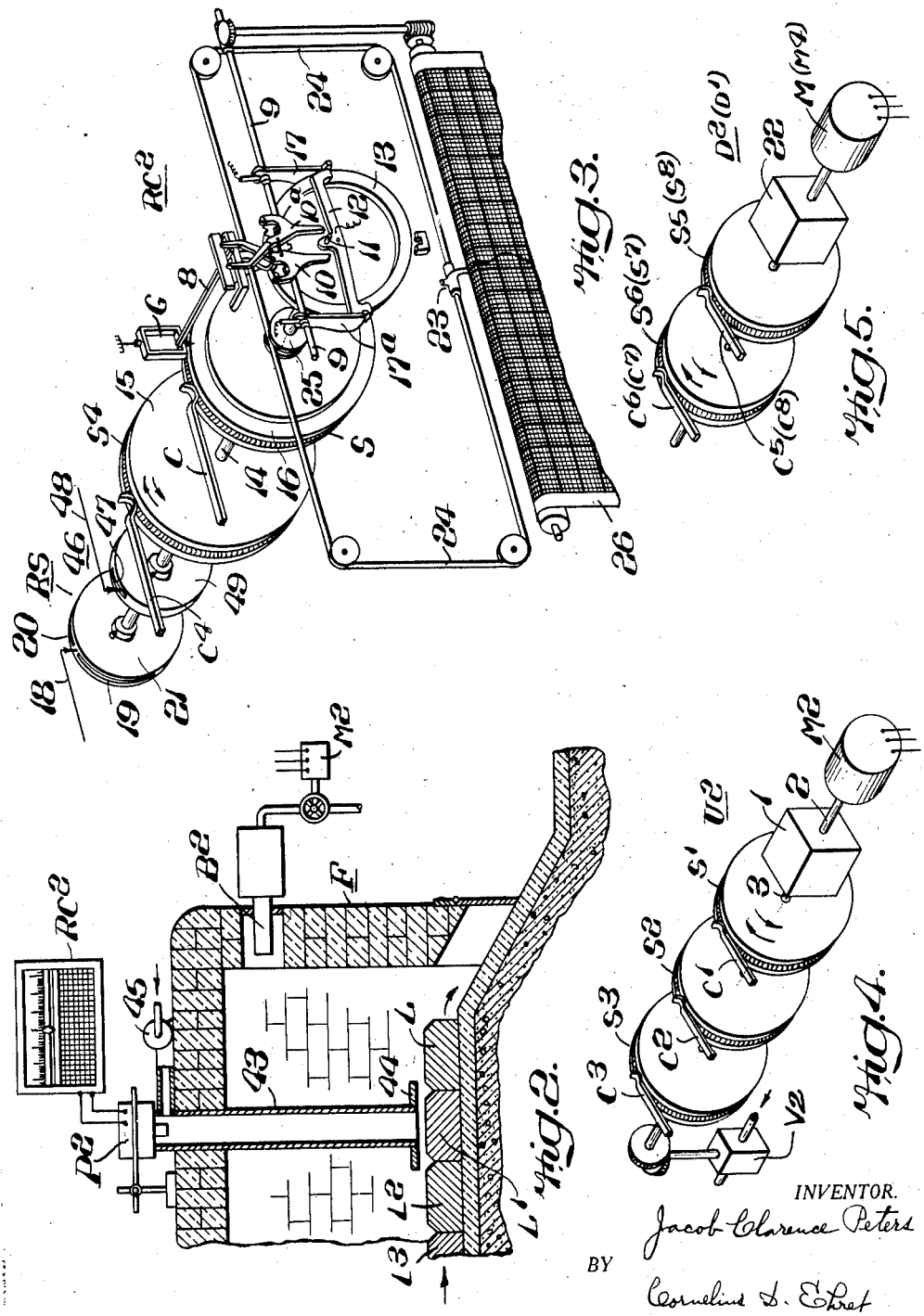
INVENTOR.
Jacob Clarence Peters
BY
Cornelius S. Ehret
ATTORNEY.

Dec. 21, 1943.  J. C. PETERS  2,337,410
ELECTRICAL CONTROL SYSTEM
Filed Nov. 25, 1941   3 Sheets-Sheet 3
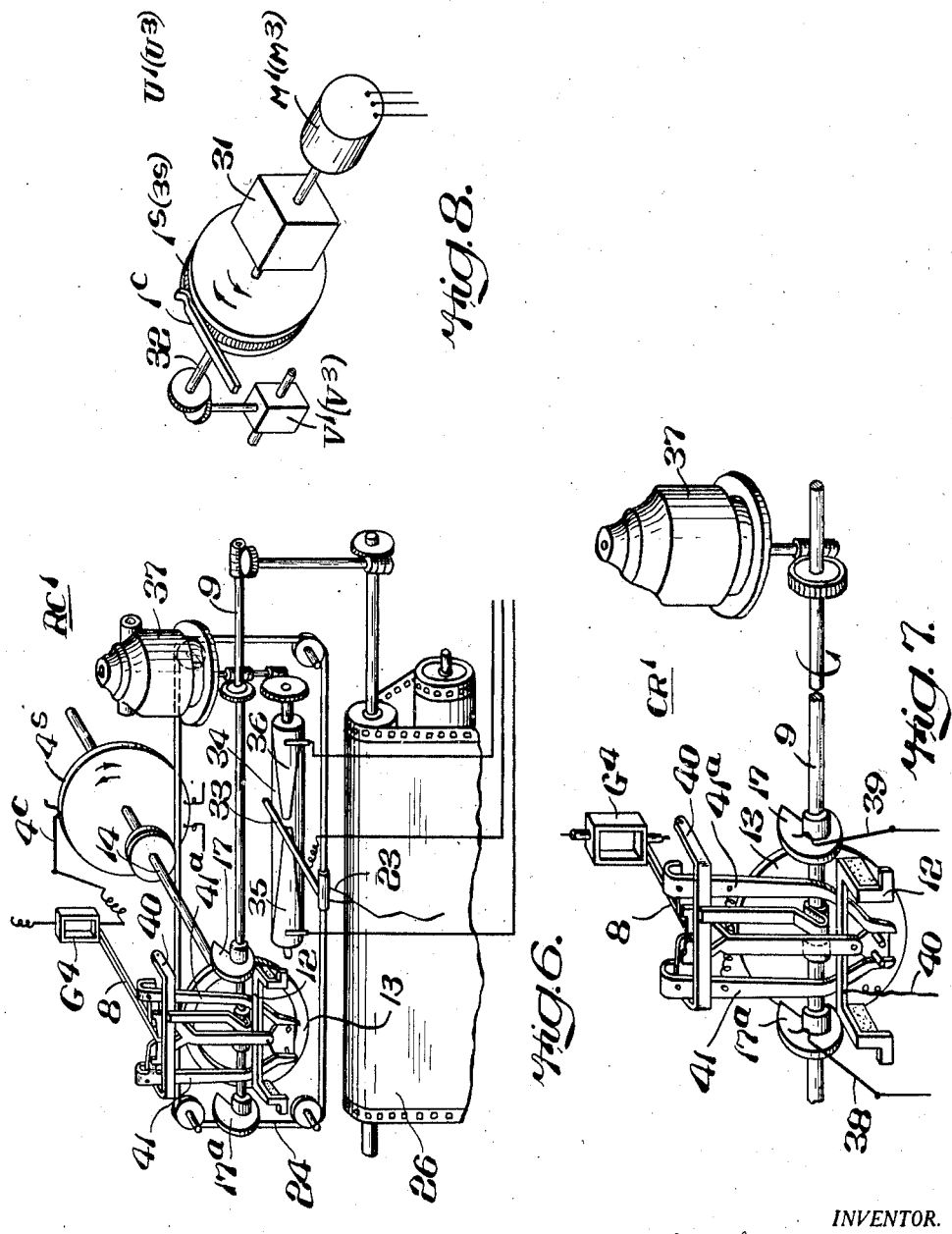
INVENTOR.
Jacob Clarence Peters
BY
Cornelius D. Ehret
ATTORNEY.

Patented Dec. 21, 1943

2,337,410

UNITED STATES PATENT OFFICE 2,337,410

ELECTRICAL CONTROL SYSTEM

Jacob Clarence Peters, Jenkintown, Pa., assignor to Leeds & Northrup Company, Philadelphia, Pa., a corporation of Pennsylvania Application November 25, 1941, Serial No. 420,349

15 Claims. (Cl. 263—2)

My invention relates to control systems, particularly electrical control systems, for varying the settings of valves, rheostats, or like control members, in response to changes in magnitude of a condition such as temperature, pressure, rate of flow, ion-concentration, or other physical, chemical, or electrical condition.

In accordance with one aspect of my invention, a master control member and one or more auxiliary control members, all mutually affecting the magnitudes of a condition at different zones but individually having at one zone an effect more pronounced or immediate than at the other zone or zones, are substantially immediately adjusted in like senses in response, preferably proportional, to change in magnitude of the condition at the zone more directly or immediately under control of the master control member; with the further provision, preferably suspended when the deviation of magnitude of the condition at said one zone is too great or is outside of a predetermined range, that the setting of each of the auxiliary control members is additionally subject to variation in sense corresponding with the sense of, and preferably at a rate corresponding with the magnitude of deviation, at the zone more directly under control of an auxiliary control member, from the desired magnitude of the condition for that zone, which desired magnitude may be different from or the same as the desired magnitude for aforesaid one of said zones.

Further in accordance with my invention, so long as there exists at said one zone deviation from the magnitude of the condition desired therefor, there is produced and utilized a control effect tending slowly to vary the settings of all the control members, master and auxiliary, in like sense, cumulatively to reduce that deviation.

My invention further resides in methods and apparatus having the features hereinafter described and claimed.

For an understanding of my invention, reference is made to the accompanying drawings, in which:

Fig. 2 is a sectional view, in side elevation, of the discharge end of the furnace of Fig. 1 and associated equipment;

Figure 1:
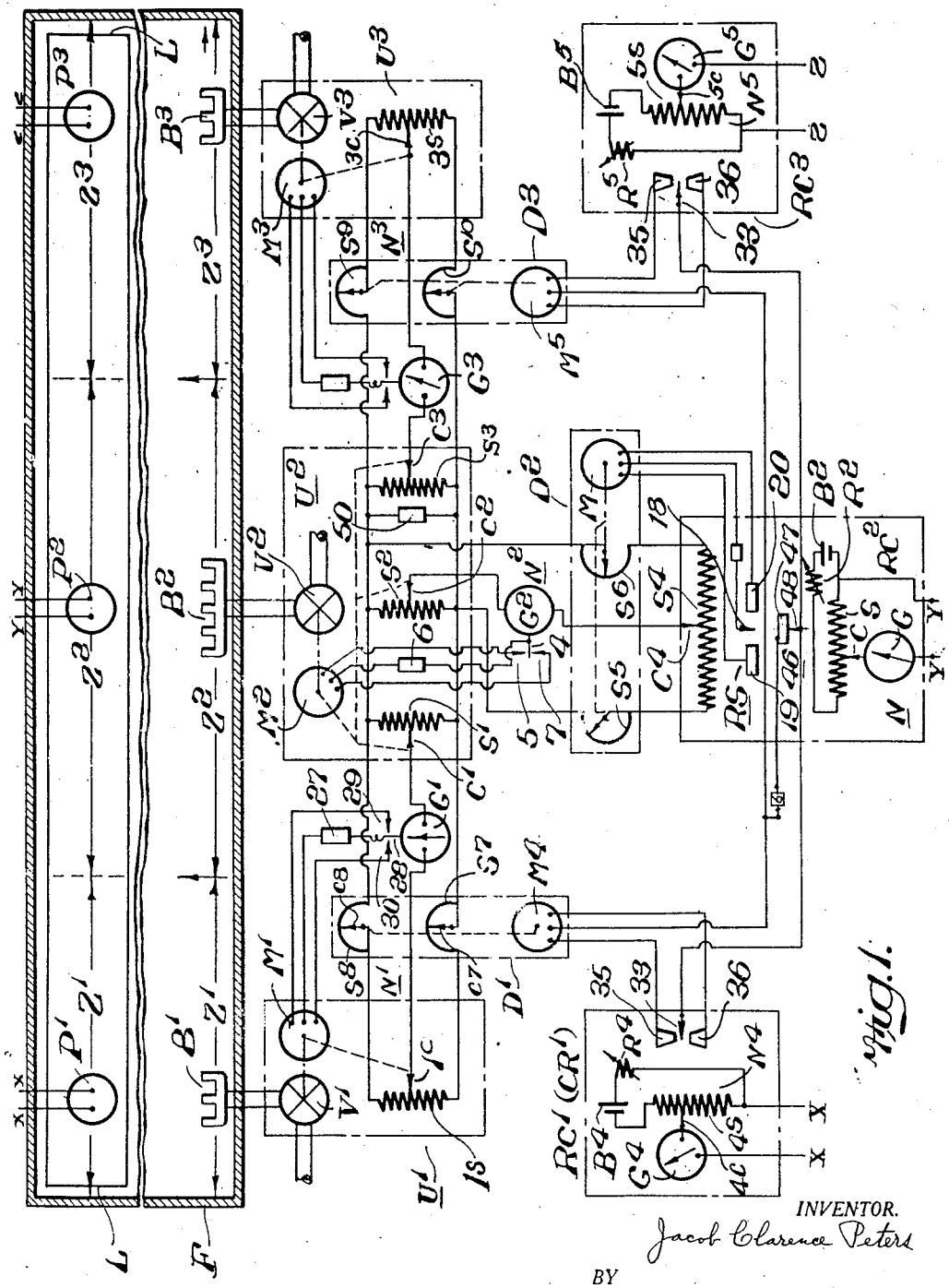
Fig. 1 illustrates, principally diagrammatically, my control system as applied to a billet furnace, of which only the ends, with roof omitted, are shown.

Fig. 3, in perspective, shows significant elements of recorder-controller mechanism suited for use in the system of Fig. 1;

Figs. 4, 5 and 8, in perspective, show significant elements of units of the system of Fig. 1;

Figs. 6 and 7, in perspective, show alternative forms of controller mechanism suited for use in the system of Fig. 1.

Though use of my control system is not limited thereto, it is shown, by way of example, in Fig. 1, as utilized to control burners B1, B2, B3, of a furnace for heating billets, which term comprehends also masses of metal, in accordance with the temperatures of zones, or of work therein, at or near the discharge end of the furnace.

In this example, the several zones, Z1, Z2, Z3, extend longitudinally of the furnace F parallel to the direction of feed of the work and more or less overlap transversely of the furnace and the direction of feed.

The burners B1, B2 and B3 are controlled by the control members, valves, V1, V2 and V3 respectively; of these V2 may be considered the "master control member," and V1 and V3 "auxiliary control members."

The unit U2 for actuating valve V2 of burner B2 and for producing electrical effects corresponding with the valve settings comprises, Figs. 1 and 4, a reversible motor M2, valve V2, and slidewires S1, S2 and S3 rotated in unison by motor M2 with respect to their contacts C1, C2, C3, all driven by motor M2 through suitable gearing, generically illustrated by gear box 1, between motor shaft 2 and slidewire shaft 3.

Energization and direction of rotation of motor M2 are controlled by the contacting galvanometer G2, or equivalent relay, responsive to unbalance of a bridge network N2 comprising aforesaid slidewire S2 of the valve-actuating unit U2 and slidewire S4 of a recorder-controller unit RC2, Figs. 1 and 3, hereinafter described. For one sense of unbalance of network N2, contacts 4 and 5 of the contacting-galvanometer G2 complete a circuit including motor M2 and a suitable source of power 6 to effect rotation of motor M2 in one direction whereas for unbalance of network N2 in opposite sense, contacts 4 and 7 of the relay are brought into engagement to effect energization of motor M2 for rotation in opposite direction. In either case, the motor M2 concurrently with its adjustment of valve V2 toward open or closed position effects rebalancing adjustment of slidewire S2 with respect to its contact C2 until the contact 4 of relay G2 moves to open-circuit position and motor M2 thereupon stops.

As hereinafter appears, a change in magnitude of the temperature at zone Z2 of the furnace or of a predetermined portion of a billet L therein causes, by adjustment of contact C4 with respect to slidewire S4, an unbalance of network N2 in sense and to extent corresponding with the sense and magnitude of the temperature change; consequently, motor M2 in restoring balance of the network N2 moves valve V2 in sense to reduce the temperature change and to an extent dependent upon, or proportional to, the temperature change.

The arrangement shown for effecting adjustment of slidewire S4 in accordance with changes in temperature comprises a mechanical-relay mechanism RC2, Fig. 3, generally of the type disclosed in United States Letters Patent No. 1,935,732 to Squibb and United States Letters Patent No. 1,125,699 to Leeds. The coil of galvanometer G, which controls adjustment of slidewire S4 by aforesaid mechanical relay mechanism, is connected in series with a thermocouple, preferably of a radiation-pyrometer P2, Fig. 1, across a variable portion of potentiometer slidewire S, Figs. 1 and 3, adjusted concurrently with slidewire S4.

When the temperature-measuring network N comprising slidewire S and thermo-couple P2 is in balance, the pointer 8 of galvanometer G is in its central or neutral position shown in Fig. 3; upon change in magnitude of the temperature to which pyrometer P2 responds with resultant unbalance of network N, the galvanometer pointer 8 deflects to the right or left in dependence upon the sense of the temperature change whereupon the mechanical relay mechanism in each of one or more of its subsequent cycles effects adjustment of slidewire S until the effective potentiometer voltage again balances the thermo-couple voltage.

As more fully described in aforesaid Squibb patent, the continuously rotating shaft 9 is provided with cam structure, not shown, which provides for intermittent clamping of pointer 8, once per revolution of shaft 9 or cycle of the mechanism, and while, the pointer is clamped, for release of the feelers 10, 10a for movement toward each other and into engagement with opposite sides of the clamped pointer. If the pointer is clamped in position displaced from its neutral position, one or the other of the feelers, depending upon the sense of displacement of the pointer, in moving toward engagement with the pointer engages pin 11 of the driving clutch member 12 and moves it through an angle substantially proportional to the galvanometer's deflection. Subsequently in the cycle, under control of cam structure (not shown) on shaft 9, the member 12, in the angularly displaced position to which set as aforesaid, is brought into engagement with the driven clutch member or disk 13 secured to shaft 14 upon which are mounted the supporting disks 15, 16 of aforesaid slidewires S4 and S. During such engagement of clutch members 12 and 13, one or the other of the restoring cams 17, 17a rotating with shaft 2 engages clutch member 12 and returns it to the neutral or horizontal position shown in Fig. 3, so effecting angular adjustment of slidewires S and S4 in sense and to extent determined by the sense and extent of deflection of galvanometer pointer 8. Before beginning of the next cycle, pointer 8 is released for response to the state of balance of network N and clutch member 12 is moved out of engagement with disk 13 in readiness for another adjustment by feelers 17, 17a in event the network N is still unbalanced.

Assuming networks N and N2 are balanced and that there is then an increase in magnitude of the temperature to which P2 is responsive, (the temperature of zone Z2 or of the central portion of billet L) the resulting unbalance of network N causes galvanometer G to deflect whereupon the mechanical relay mechanism effects adjustment of slidewire S with respect to its contact C in sense and to extent restoring, by one or more steps, balance of network and concurrently effects adjustment of slidewire S4 with respect to its contact C4 to unbalance, or shift the balance point of, network N2 in sense and to extent corresponding with the increase in magnitude of the temperature.

Galvanometer G2 of network N2 thereupon, as above described, effects operation of motor M2 for rebalancing adjustment of slidewire S2 and concurrent resetting of valve V2 in direction to reduce the heat input to the furnace.

The control system V2, RC2 as thus far described has a drooping temperature/load characteristic; for abnormal loads, the temperature will be stabilized by the control system comprising pyrometer P2, controller RC2, and unit U2 at magnitudes lower than normal or desired magnitude whereas for subnormal loads, the temperature will be stabilized at somewhat super-normal magnitudes.

To eliminate this droop and provide for maintenance of substantially constant temperature despite load variations, there is provided the unit D2, Figs. 1 and 5, comprising reversible motor M, two slidewires S5 and S6, oppositely and to like extents adjustable thereby at suitably low rate through reduction gearing 22, and for the controller RC2, there is provided the reversing switch RS comprising stationary contact 18 and a pair of contacts 19, 20 carried by disk 21 rotatable with shaft 14.

When, in this modified arrangement, network N is temporarily balanced at a temperature higher or lower than the magnitude thereof desired for zone Z2, contact 18 is in engagement with one or the other of contacts 19 or 20 to effect energization of motor M slowly to shift the balance point (the relative positions of slidewires S2 and S4 for which balance obtains) of network N2 in that sense causing a further adjustment of valve V2 in direction proper further to reduce the difference between the actual temperature and the desired magnitude thereof. This shift of balance point of network N2 more or less slowly continues until temperature-measuring network N is balanced at the desired temperature at which time the disk 21 of reversing switch RS, movable in unison with slidewire S of network N, has been returned to such position contact 18 is out of engagement with contacts 19 and 20 so effecting de-energization of motor M of unit D2.

Whether or not the control system for valve V2, or equivalent heat control member, includes the droop-correction unit D2, the angular adjustments of shaft 14 may be utilized to move an indicating pointer or marker with respect to a temperature scale; in the particular arrangement shown in Fig. 3, the stylus or pen 23 is coupled by cord 24 and pulley or drum 25 to shaft 14 for movement, in response to deflections of galvanometer G, with respect to the temperature scale on recorder chart 26 driven at constant speed, as by gearing coupling it to shaft 9.

For a wide furnace, two or more burners are required and if each were controlled generally as above described in response to change in magnitude of the temperature of its respective zone of the furnace, the influence of each of the different zones upon the pyrometers of the other zones would cause hunting of the control systems. This is avoided by the arrangement now described.

The unit U1 for actuating valve V1 of burner B1 and for providing electrical effects corresponding with the settings of valve V1 comprises, Figs. 1 and 8, a reversible motor M1, slidewire 1S moved thereby with respect to contact 1C, and valve V1, all driven from motor M1 through suitable reduction gearing generically illustrated by gear box 31.

Energization of motor M1, from any suitable source of current 27, usually for convenience the same source utilized for supplying current to all of motors M—M5, is controlled by contacting galvanometer G1, or equivalent relay device, in response to unbalance of the network N1 comprising slidewire 1S, adjusted in unison with valve V1 by motor M1, and slidewire S1 adjusted, as previously herein described, in unison with valve V2 by motor M2.

When, for example, valve V2 is opened wider by operation of its motor M2 to check further fall of temperature, the concurrent adjustment of slidewire S1 unbalances network N1 in such sense that contacts 28, 29 of galvanometer G1 are moved into engagement effecting operation of motor M1 in direction effecting wider opening of valve V1. Contacts 28, 29 remain in engagement until network N1 is rebalanced, or substantially so, by adjustment of slidewire 1S, in unison with valve V1, by motor M1.

Conversely, when valve V2 is operated in reverse direction, toward closed position, by its motor M2, the simultaneous adjustment of slidewire S1 unbalances network N1 in opposite sense whereupon contacts 28, 30 of galvanometer G1 close to effect rotation of motor M1 in sense reducing the opening of valve V1 until network N1 is rebalanced.

As thus far described, the control system causes operation of valves V1 and V2 in like sense and to similar or definitely predetermined extents whenever network N2 is unbalanced either in response to a change in temperature, as detected by pyrometer P2, or by the slow drift-corrective action of unit D2 or in accordance with the resultant of those effects. However, it is desirable that upon the control of valve V1, there be superimposed a modifying control action in response to deviations from normal or desired magnitude of the temperature in another zone of the furnace.

To that end, in the particular arrangement shown in Fig. 1, the pyrometer P1, at the discharge end of furnace F but substantially displaced laterally of furnace F from pyrometer P2, effects, through one or the other of the mechanisms of Fig. 6 or 7, or equivalent, control of the reversible motor M4 of unit D1, Fig. 5.

The slidewires S7 and S8 are rotatable in unison by motor M4 with respect to their contacts C7, C8, to shift the balance point of the network N1 in one sense for one direction of rotation of motor M4 and in opposite sense for reverse direction of rotation thereof; the sum of the effective magnitudes of S7 and S8 is constant.

So long as the temperature directly affecting pyrometer P1 is below normal, the motor M4 is operated in one direction, preferably intermittently for periods proportional to existing deviation of that temperature from normal, to unbalance or tend to unbalance network N1 in that sense which causes, through galvanometer G1, operation of motor M1 in proper direction further to open valve V1 or by equivalent means to increase the heat input of burner B1 or equivalent heating means.

Conversely so long as the temperature measured by pyrometer P1 is abnormal, motor M4 operates in the reverse direction to unbalance, by its adjustment of slidewires S7, S8, network N1 in opposite sense so to effect operation of motor M1 in valve-closing of or heat-reducing direction and preferably, by means hereinafter described, at an average rate proportional to the deviation of temperature from normal or desired magnitude.

When it is desired to record, as well as control in response to changes thereof, zone or work temperature to which pyrometer P1 is responsive there may be utilized the recorder-controller RC1, Fig. 6, generally similar to recorder-controller RC2, Fig. 3, except in respects which hereinafter appear.

Slidewire 4S, Fig. 6, is automatically adjusted by mechanical relay mechanism (in this figure as of the aforesaid Leeds type but generically illustrative as well of the aforesaid Squibb type), in response to deflections from neutral of the pointer of galvanometer G4 occurring when potentiometer network N4 comprising slidewire 4S, pyrometer P1 and galvanometer G4 is unbalanced.

So long as network N4 is in balance, the pointer of galvanometer G4 remains in the neutral position shown in Fig. 6 and the clamping member 40 moves up and down idly in each cycle without effect upon the position of member 12. When network N4 is out of balance, the pointer of galvanometer G4 is displaced from its neutral position, in sense corresponding with sense of unbalance, so that the tip thereof is positioned between clamping member 40 and one or the other of the pivotally mounted feelers 41, 41 having the same general purpose as feelers 10, 10a of Fig. 3. So long as the pointer is displaced, each upward movement of pivoted clamping member 40 causes one or the other of the feelers to swing arm 12, while disengaged from disk 13, through an angle proportional to the galvanometer deflection and in a direction corresponding therewith. Later in each cycle, as described in connection with Fig. 3, arm 12 is returned to neutral, while in driving engagement with disk 13, to effect rebalancing adjustment of slidewire 4S.

Upon change in magnitude of the temperature to which pyrometer P1 responds, the mechanism RC1, under control of galvanometer G4, effects aforesaid adjustment of slidewire 4S on shaft 14, in one or more steps, to restore the temperature-measuring network N4 to balance at the then existing temperature of zone Z1, whether it be above, below or at the normal or desired magnitude.

These adjustments of the slidewire shaft 14 are transmitted to contact 33 as by cord 24 so that the various positions of contact 33 are determined by and correspond with the different magnitudes of the temperature of zone Z1 or work therein. When that temperature is of desired magnitude, contact 33 is positioned between, out of engagement with, the contacts 35 and 36, one of which engages contact 33 when the temperature is sub-normal and the other of which engages contact 33 when the temperature is above normal.

The contacts 33, 35 and 36 comprise a reversing switch for controlling the energization and direction of rotation of motor M4 which, as above described, differentially adjusts the slidewires S7, S8 of network N1. Motor M4 may run continuously so long as there exists deviation of temperature from normal but preferably it runs intermittently and for periods proportional to the magnitude of the temperature deviation; to accomplish that end, the contacts 35, 36, in the particular arrangement of Fig. 6, are mounted upon a rotating drum 34 and each is of width, measured peripherally of the drum, which progressively increases from the center toward the end of the drum. Consequently, motor M4, for each revolution of drum 34, is energized for a fraction of the time required per revolution which is the greater the greater the displacement of contact 33 from its central or neutral position.

Contacts 35, 36 may be similar in shape or may be of different divergence to suit the operating characteristics of the furnace or other controlled installation. Drum 34 may be driven from any suitable source, for example, from motor 37 used to operate the mechanical relay mechanism of controller RC1.

When it is not desired to record the temperature of zone Z1 or that portion of billet L therein, there may be used, instead of the recorder-controller RC1 of Fig. 6, the controller CR1 of Fig. 7 utilizing the mechanical relay of Fig. 6, or of Fig. 3, but with omission of provision for effecting automatic adjustment thereby of slidewire 4S. With this latter arrangement, the contact 4C of the slidewire 4S is manually set to position corresponding with the desired temperature of zone Z1.

The energization of motor M4 in sense corresponding with the sense of the deviation of temperature of zone Z1 from normal and for periods proportional to the magnitude of the deviation is effected by use of the restoring cams 17, 17a and arm 12 (Fig. 7) as the contacts of a reversing switch equivalent to the reversing switch comprising contacts 33, 35 and 36 of Figs. 1 and 6. The cams 17, 17a are suitably electrically insulated from shaft 9 and are connected, as by brushes 38, 39, to two conductors of the circuit of motor M4; arm 12, for each revolution of shaft 9, is swung by the mechanical relay mechanism from the neutral position shown through an angle substantially proportional to the deflection of the galvanometer. When subsequently in each cycle, arm or contact 12 is engaged by one or the other of cams 17, 17a and returned thereby to neutral position, the energizing circuit of motor M4 is completed for a period proportional to the existing unbalance of network N4.

When network N4 is in balance, arm 12, Fig. 7, is either not engaged by either of cams 17, 17a or only briefly by one or both of them; in any event, the periods of energization or rotation of motor M4 under this circumstance are actually or practically nil.

The unit U3 comprising reversible motor M3, slidewire 3S and valve V3, adjusted by the motor in unison with slidewire 3S, is similar to unit U1. Unit D3 comprising reversible motor M5 and slidewires S9, S10, in opposite sense adjusted thereby in bridge network N3 comprising slidewire S3, 3S and contacting galvanometer G3, is similar to unit D1.

Unit RC3, like unit RC1, may comprise either of the mechanisms shown in Figs. 6 and 7; in either case, so long as network N5 comprising thermo-couple P3, potentiometer slidewire 5S, source of slidewire current B5, and current-standardizing resistance R5 is unbalanced, contact 33 of unit RC3 engages, preferably intermittently for periods substantially proportional to the deviation from normal of the temperature of zone Z3 or work therein, one or the other of contacts 35, 36 to cause motor M5 differentially to adjust slidewires S9 and S10 of network N5 and so shift the balance point thereof. The galvanometer G3, in response to this unbalance of network N3, effects, through motor M3, rebalancing adjustment of slidewire 3S and movement of valve V3 in proper sense to reduce aforesaid temperature deviation.

In the particular system shown, there is one master controller, comprising units U2, D2, RC2, and two follow-up or auxiliary controllers, one comprising units U1, D1, RC1 and the other comprising units U3, D3, and RC3. For a still wider furnace or a furnace having a greater number of burners, or other heating elements such as electrical heaters, generically comprehended herein by the term "burners," it will be understood the master unit U2, Fig. 4, may be provided with one or more additional slidewires each forming part of a network, similar to network N1 or N3, of the corresponding additional follow-up control.

With the system as described, a change in magnitude of the furnace or work temperature measured by pyrometer P2 substantially immediately effects a proportional change in the settings of all three valves or equivalent control elements whereas upon change of the furnace or work temperature as measured by pyrometer P1, or P3, only the setting of auxiliary control member, valve V1 or V3, is changed, and at low rate, without causing effect upon the setting of master valve V2 or of the valve of the other follow-up control.

The control points for networks N4 and N5 may be set for the same normal or desired temperature, similar to or different from the control point of network N, or for different normal temperatures, one or both of which may be different from the control point of network N.

Although all burners are concurrently controlled in response to changes in work or furnace temperature as measured by pyrometer P2, cumulatively to affect the temperature of zone Z2 each of them is subject to an independent control action making it possible to maintain different desired work or furnace temperatures at zones Z1, Z2 and Z3. It is thus possible, for example, to heat one or both ends of each billet to predetermined temperature or temperatures higher than the temperature of the central portion so to compensate for the greater heat loss from the ends of the billets during rolling thereof; this control also makes it feasible to compensate for such effects upon the work temperature as variations in the supply pressures of the fuel and air, or either of them, variable cooling effects upon the furnace exterior, and the like.

Preferably when the temperature of zone Z2 is above or below predetermined limits, the units D1 and D3 are effectively disabled to preclude control of valves V1 and V3 in accordance with the temperatures in zones Z1 and Z3 without however preventing their control by slidewires S1 and S3 of unit U2 in accordance with the temperature of zone Z2. That is accomplished, Figs. 1 and 3, by limit switch 46 in circuit with motors M4 and M5 and their source of supply current.

Contact 47 of limit switch 46 is mounted upon disk 49, Fig. 3, rotatable with slidewire S of the controller mechanism RC2 and is of angular extent corresponding with a suitable range of temperature, or other controlled condition, within which it is desired the balance points of network N1, N3 shall be variable by units D1 and D3.

Whenever the temperature of zone Z2 falls below or rises above temperatures determined by the position of disk 49 on shaft 14 and the length of the contact 47, the contacts 47, 48 of limit switch 46 move out of engagement so preventing energization of either of motors M4, M5 from their source of current 6 which may be the same as or independent of the source for any one or more of motors M1—M3.

The networks N1, N2 and N3 may be energized from a common source of current 50 as shown in Fig. 1, or they may be provided with individual sources of current; these networks may be energized from one or more sources of direct current or from a source of alternating current through a common transformer or individual step-down transformers. With loss of independence of the settings of valves V1 and V3, tolerable in some cases, the networks N1 and N3 may in effect be combined by omission of slidewire S1 (or S3) and by shifting the connections of galvanometer G1 (or G3) from contact C1 (or C3) to contact C3 (or C1).

When the control system is utilized for a billet furnace, each of the pyrometers P1, P2, P3 is preferably, Fig. 2, of the type disclosed and claimed in Letters Patent 2,275,265 of Mead having a sighting tube 43 whose lower end is flared or otherwise provided with a laterally extending shield 44 which prevents reflection into the tube 43, from the work surface under observation, of radiation from flame or from the furnace walls. The sighting tube 43 is kept free of fumes, smoke or flame by a stream of air, or other gas, forced by pump 45, or equivalent, downwardly through tube 43.

It shall of course be understood that pyrometers P1, P2, P3 are replaced by suitable other condition-responsive devices when networks N, N4 and N5 are to measure a condition other than temperature. For example, when the condition to be measured is ion-concentration, for pyrometers P1, P2, P3 will be substituted ion-concentration cells such as disclosed in Letters Patent 2,108,293 to Perley; for measurement of rates of flow of a liquid, pyrometer P1, P2, P3 may each be replaced by manometer-generator arrangement such as shown in Fig. 1 of Letters Patent 1,093,707 to Rosecrans; for measurement of electrical load, the pyrometers may each be replaced by a wattmeter and potentiometer arrangement such as wattmeter W1 and potentiometer R1 of Fig. 1 of Letters Patent 2,054,411 to Doyle; for measurement of pressure or liquid level, the pyrometers may each be replaced by a float-actuated potentiometer such as TP, TS of Fig. 1 of Letters Patent 2,119,223 to Cooper.

It is not necessary in all installations that networks N, N4, N5 of Fig. 1 be of the potentiometer type; they may be of any other suitable type of balanceable network, for example a Wheatstone bridge such as in Letters Patent 2,102,030 to Quereau.

It shall likewise be understood, the valves V1, V2 and V3 are replaceable by other control elements, such as rheostats, "Vari-trans," governors, and the like suited to control the particular condition or conditions under measurement by varying the application of an agent, such for example as heat, electricity, or a chemical.

Moreover, the networks N and N2 may be replaced by any suitable arrangement, electrical or otherwise, capable of adjusting valve V2 in accordance with the temperature of zone Z2; for example for networks N and N2 may be substituted an electrical system such as shown in Fig. 1 of Letters Patent 2,300,537 to Davis; as an example of a non-electrical substitute there may be utilized an arrangement such as disclosed in United States Letters Patent No. 920,883 to Ruff.

What I claim is:

1. The method of controlling the settings of members adjustable to vary the application of an agent affecting the magnitude of a condition and each primarily affecting a corresponding zone which comprises in response to change in magnitude of said condition at one zone rapidly shifting the settings of all of said members in sense and to extent representative of said change, and slowly varying the settings of all of said members, except the one corresponding with said one zone, each in sense corresponding with the deviation from desired magnitude of said condition at the corresponding zone and independently of the magnitude of said condition at any other zone.

2. The method of controlling the settings of members adjustable to vary the application of an agent affecting the magnitude of a condition which comprises in response to change, at one zone, in magnitude of said condition rapidly shifting the settings of all of said members in like sense and to extent substantially proportional to said change, producing and utilizing a control effect tending slowly to vary the settings of all of said members in like sense in response to and so long as there exists deviation at said one zone from desired magnitude of said condition, and producing and utilizing another control effect tending to vary the settings of all of said members, except the one corresponding with said one zone, each in sense and at a rate corresponding with the sense and extent of the deviation from desired magnitude of said condition at the corresponding zone and independently of the magnitude of said condition at any other zone.

3. The method of controlling the burners of different zones of a furnace which comprises changing their settings in like sense substantially simultaneously and rapidly in response to changes in magnitude of temperature at one zone of the furnace, and slowly changing the settings of all of said burners, except the one for said one zone, each in accordance with sense of departure at the corresponding zone of the furnace from the magnitude of temperature desired therein and independently of the temperature of any other of said zones.

4. The method of controlling the burners of a furnace which comprises in response to change in magnitude of temperature at one zone of the furnace promptly varying in like sense the settings of all the burners each to extent substantially proportional to said temperature change, and slowly varying the settings of said burners, except the one for said one zone, each at a rate substantially proportional to the deviation, at the corresponding zone of the furnace, from the magnitude of temperature desired therein and independently of the variation in setting of any of the other of said burners.

5. A control system comprising control members individually adjustable to vary at different zones the there occurring magnitudes of a condition, a balanceable network including impedances respectively adjustable with said control members, means responsive to unbalance of said network for effecting rebalancing adjustment of one of said impedances and change in setting of its associated control member, means responsive to change in magnitude of said condition at one of said zones for effecting unbalancing adjustment of another of said impedances and change in setting of its associated control member to extent corresponding with the magnitude of said change, and means, including means responsive to changes in magnitude of said condition at another of said zones, for shifting the balance point of said network in sense corresponding with deviation from a predetermined magnitude of said condition at said other zone.

6. A control system comprising control members individually adjustable to vary at different zones the there occurring magnitudes of a condition, a balanceable network including impedances adjustable respectively with said control members, means responsive to unbalance of said network for effecting rebalancing adjustment of one of said impedances and change in setting of its associated control member, means responsive to change in magnitude of said condition at one of said zones for effecting unbalancing adjustment of another of said impedances and change in setting of its associated control member to extent corresponding with aforesaid change, means responsive to change in magnitude of said condition at another of said zones, and means controlled by said last-named responsive means for shifting the balance point of said network in sense corresponding with, and at rate substantially proportional to, deviation from a predetermined magnitude of said condition.

7. A control system comprising a master control member and at least two auxiliary control members, all individually adjustable to vary at each of different zones the there obtaining magnitudes of a condition, means for effecting substantially concurrent adjustments in like sense of all of said members upon change in magnitude of said condition at one of said zones comprising means responsive to change in magnitude of said condition at one of said zones to effect adjustment of said master control member to position corresponding with the existing magnitude of one condition, balanceable networks each including a variable impedance adjustable with said master control member to position representative of the setting thereof and a variable impedance adjustable with one of said auxiliary control members, and means responsive to unbalance of each of said networks to adjust one of said auxiliary control members and to effect rebalancing variation of the impedance adjustable therewith, and means responsive to change in magnitude of said condition at another or others of said zones for shifting the balance point of each of said networks to effect adjustment of the corresponding auxiliary control member or members independently of the other control members.

8. A control system comprising electrical networks respectively affected by changes, at different zones, in magnitude of a condition, control means, in number corresponding with the number of said zones, adjustable to vary the magnitudes of said condition at said zones, means including one of said networks to adjust one of said control means to extent corresponding change, at one of said zones, in magnitude of said condition, means for effecting corresponding adjustment of each of the other control means comprising a balanceable network including variable impedances respectively adjusted in unison with said one of said control means and with another of said control means, and including one of said first-named networks and means controlled thereby, for varying the adjustment of each of said other control means.

9. A control system comprising control members, including a master control member and at least one auxiliary control member, individually adjustable to vary at different zones the magnitudes of a condition, means for effecting substantially concurrent adjustments of all of said control members comprising means responsive to change at one of said zones in the magnitude of said condition to effect adjustment of said master control member to extent corresponding with said change, balanceable networks in number corresponding with the number of auxiliary control members and each including variable impedances respectively adjustable in unison with said master control member and one of said auxiliary control members, and means responsive to unbalance of each of said networks for effecting adjustment of the corresponding one of said auxiliary control members and network-rebalancing variation of the impedance adjustable therewith, means for effecting adjustment of each of said auxiliary control members independently of said master control member comprising means for shifting the balance point of the associated network, and means for disabling said last-named means when at one of said zones the there existing magnitude of said condition is outside of a predetermined range.

10. A control system comprising control members, including a master control member and at least one auxiliary control member, individually adjustable to vary the magnitude of a condition at each of different zones, means for immediately effecting substantially concurrent adjustments of all of said control members in like sense and to extent substantially proportional to the change in magnitude of said condition at a predetermined one of said zones, means for effecting substantially concurrent adjustments of all of said control members at low rate and in like sense so long as there exists deviation from predetermined magnitude of said condition at said one of said zones, and means for individually varying the setting of each of said auxiliary control members so long as there exists deviation at the corresponding zone from predetermined magnitude of said condition and in sense suited to reduce said deviation.

11. A control system for a billet furnace having burners in different zones disposed side by side transversely of the direction of billet feed comprising electrical pyrometers, one in each of said zones, concurrently to measure the temperatures along a billet, individual motive means for effecting adjustment of said burners, means for effecting substantially immediate changes in the settings of said burners in response to change in temperature at a selected one of said zones comprising the pyrometer in that zone, balanceable networks, in number less by one than the number of said burners, each including an impedance adjusted concurrently with the burner for said selected one of said zones and an impedance adjusted concurrently with the burner for another of said zones, and means responsive to unbalance of each of said networks for effecting operation of the motive means for the last-named burner to vary the setting thereof until the concurrent adjustment of the last-named impedance restores balance of the network, and means for effecting adjustment of each of the burners other than the one at said selected one of said zones comprising the corresponding pyrometer and means controlled thereby to shift the balance point of the network including the impedance adjusted concurrently with the burner for that zone.

12. A control system comprising control members including a master control member and at least one auxiliary control member, individually adjustable to vary the magnitude of a condition at corresponding zones, a master control unit for a selected one of said zones comprising said master control member, at least one impedance adjustable therewith to positions corresponding with the settings thereof, and motive means for effecting concurrent adjustment of said master control member and said impedance or impedances, a control unit for each of said auxiliary control members comprising an impedance adjustable therewith and motive means for effecting concurrent adjustment of the auxiliary control member and impedance adjustable therewith, means responsive to changes in magnitude of a condition at said selected zone to control energization of the motive means of said master control unit, means for controlling energization of the motive means for each of said auxiliary control units comprising means responsive to unbalance of a network including an impedance of said master control unit and an impedance of the corresponding auxiliary control unit, and means for shifting the balance point of each of said networks comprising a unit including at least one impedance included in that network and motive means for adjusting it, and means for controlling said last-named motive means responsive to changes in magnitude of said condition at the corresponding zone.

13. The method of procuring uniformity or predetermined differences of temperatures along the length of a billet which comprises passing it through a furnace in direction substantially at right angles to its length, measuring the temperatures of zones disposed side by side and extending longitudinally of the furnace so that different portions lengthwise of the billet concurrently pass through the zones, in response to change of temperature in one of said zones quickly varying the rates of combustion in all of said zones in like sense, and more slowly changing the rate of combustion in each of the other of said zones in sense corresponding with the deviation of its temperature from the desired temperature thereof.

14. The method of procuring uniformity or predetermined differences of temperatures along the length of a billet which comprises passing the billet through a furnace in direction substantially at right angles to its length, measuring the temperatures of zones disposed side by side and extending longitudinally of the furnace so that different portions lengthwise of the billet concurrently pass through the zones, in response to change of temperature in one of said zones quickly varying the rates of combustion in all of said zones in like sense, and changing the rate of combustion in each of the other of said zones in sense and at a rate corresponding with the sense and magnitude of the deviation of its temperature from the desired temperature thereof.

15. The method of procuring uniformity or predetermined differences of temperature along the length of a billet which comprises passing the billet through the furnace in direction substantially at right angles to its length, measuring the temperatures of different zones transversely of the furnace and direction of travel of the billet, quickly varying the rate of combustion in all of said zones in accord with temperature deviation from desired magnitude in a selected one of said zones, and more slowly and independently varying the rates of combusion of the zones other than said selected zone each in accord with deviation of its temperature from the desired magnitude thereof.

JACOB CLARENCE PETERS.